US010772077B2

(12) United States Patent
Xu et al.

(10) Patent No.: US 10,772,077 B2
(45) Date of Patent: Sep. 8, 2020

(54) CELL RADIO NETWORK TEMPORARY IDENTIFIER C-RNTI ALLOCATION METHOD AND DEVICE

(71) Applicant: Huawei Technologies Co., Ltd., Shenzhen (CN)

(72) Inventors: Zhan Xu, Shanghai (CN); Tao Yang, Shanghai (CN); Baogang Xie, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 366 days.

(21) Appl. No.: 15/636,868

(22) Filed: Jun. 29, 2017

(65) Prior Publication Data

US 2017/0303243 A1 Oct. 19, 2017

Related U.S. Application Data

(63) Continuation of application No. PCT/CN2014/095358, filed on Dec. 29, 2014.

(51) Int. Cl.
*H04W 4/00* (2018.01)
*H04W 72/04* (2009.01)
*H04W 8/26* (2009.01)

(52) U.S. Cl.
CPC ............ *H04W 72/04* (2013.01); *H04W 8/26* (2013.01); *H04W 72/0453* (2013.01)

(58) Field of Classification Search
CPC .... H04W 72/04; H04W 72/0453; H04W 8/26
See application file for complete search history.

(56) References Cited

U.S. PATENT DOCUMENTS

2008/0139214 A1 6/2008 Sun et al.
2009/0111476 A1* 4/2009 Hamalainen .......... H04W 72/02 455/450
2013/0155981 A1 6/2013 Kitazoe
(Continued)

FOREIGN PATENT DOCUMENTS

CN 101155421 A 4/2008
CN 101523816 A 9/2009
(Continued)

OTHER PUBLICATIONS

Catt, "C-RNTI Allocation for Dual Connectivity," 3GPP TSG RAN WG2 Meeting #85 R2-140173, Prague, Czech Republic, Feb. 10-14, 2014, 2 pages.
(Continued)

*Primary Examiner* — Charles T Shedrick
(74) *Attorney, Agent, or Firm* — Slater Matsil, LLP

(57) ABSTRACT

A cell radio network temporary identifier (C-RNTI) allocation method and device are disclosed. The method includes: when UE accesses a serving cell, randomly determining, by an entity at which the serving cell is located, a start position for selecting a C-RNTI, selecting a C-RNTI for the UE within a C-RNTI interval range starting from the start position, and allocating the selected C-RNTI to the UE. So the entity at which the serving cell is located randomizes the start position of allocation performed by the entity and uses the start position as a start position of an allocation interval, so that allocation of the C-RNTI is randomized.

22 Claims, 6 Drawing Sheets

(56) References Cited

U.S. PATENT DOCUMENTS

| | | | | |
|---|---|---|---|---|
| 2015/0078302 | A1* | 3/2015 | Reial | H04L 5/0053 370/329 |
| 2015/0146665 | A1 | 5/2015 | Zhang et al. | |
| 2015/0208448 | A1* | 7/2015 | Fu | H04W 8/26 370/329 |
| 2015/0358811 | A1* | 12/2015 | Katori | H04W 8/26 455/422.1 |

FOREIGN PATENT DOCUMENTS

| | | | |
|---|---|---|---|
| CN | 101909355 | A | 12/2010 |
| CN | 101998550 | A | 3/2011 |
| CN | 103517426 | A | 1/2014 |
| CN | 103582133 | A | 2/2014 |
| CN | 103702320 | A | 4/2014 |
| CN | 103828448 | A | 5/2014 |
| WO | 2014070064 | A1 | 5/2014 |
| WO | 2014182131 | A1 | 11/2014 |

OTHER PUBLICATIONS

Potevio, "Further Consideration on C-RNTI in Dual Connectivity," 3GPP TSG-RAN WG2 Meeting #85, R2-140406, Prague, Czech Republic, Feb. 10-14, 2014, 2 pages.

NTT Docomo, Inc., "Introduction of Dual Connectivity," 3GPP TSG-RAN WG2 Meeting #88, R2-144660, San Francisco, USA, Nov. 17-21, 2014, 70 pages.

* cited by examiner

CELL RADIO NETWORK TEMPORARY IDENTIFIER C-RNTI ALLOCATION METHOD AND DEVICE

CROSS-REFERENCE TO RELATED APPLICATIONS

This application is a continuation of International Application No. PCT/CN2014/095358, filed on Dec. 29, 2014, the disclosure of which is hereby incorporated by reference in its entirety.

TECHNICAL FIELD

The present application relates to the field of wireless communications technologies, and in particular, to a cell radio network temporary identifier (C-RNTI) allocation method and device.

BACKGROUND

With development of mobile communications and broadband wireless access technologies, mobile communications services and broadband wireless access services penetrate with each other. To satisfy requirements of larger mobile communications bandwidth and cope with challenges of broadband communications mobilization, a carrier aggregation (CA) technology is introduced into a mobile communications system.

In the CA technology, as one of important technologies in Long Term Evolution (LTE), larger bandwidth is obtained by aggregating multiple contiguous or non-contiguous component carriers (CC), to improve a system data transmission rate and a system throughput and also resolve a problem of a non-contiguous frequency spectrum of an operator.

The CA technology allows user equipment (UE) with a CA capability to use multiple aggregated carriers to perform data transmission. For UE with a CA capability, multiple aggregated CCs include a primary component carrier (PCC) (also referred to as a primary serving cell) and at least one secondary component carrier (SCC) (also referred to as a secondary serving cell). Each aggregated CC is used for data transmission of the UE. Therefore, cell radio network temporary identifiers (C-RNTI) used by the UE in all CCs need to keep consistent.

Currently, when the UE accesses the PCC, the PCC allocates a C-RNTI to the UE. When the SCC is configured or activated, the PCC notifies the SCC of the allocated C-RNTI, so that the SCC allocates the C-RNTI to the UE. However, meanwhile, the SCC may be used as a serving cell of another UE and allocate a C-RNTI to another UE. In this case, a C-RNTI conflict may easily occur. That is, the C-RNTI allocated by the PCC to the UE is allocated by the SCC to another UE.

SUMMARY

In view of this, embodiments of the present application provide a C-RNTI allocation method and device, to lower a probability of conflict occurrence during C-RNTI allocation.

According to a first aspect, a cell radio network temporary identifier (C-RNTI) allocation method is provided, used to allocate a C-RNTI to user equipment (UE). The method includes, when the UE accesses a serving cell, randomly determining, by an entity at which the serving cell is located, for the serving cell from a C-RNTI value range, a start position for selecting a C-RNTI. The method also includes selecting, by the entity at which the serving cell is located, a C-RNTI for the UE from a C-RNTI interval range, where the interval range is smaller than the C-RNTI value range, and a start position of the interval range is the determined start position for selecting a C-RNTI. The method also includes allocating, by the entity at which the serving cell is located, the selected C-RNTI to the UE.

With reference to the first aspect, in a first possible implementation manner of the first aspect, the entity at which the serving cell is located randomly selects a C-RNTI for the UE from the interval range.

With reference to the first aspect or with reference to the first possible implementation manner of the first aspect, in a second possible implementation manner of the first aspect, the C-RNTI value range includes a first range and a second range, where the first range is used for UE supporting carrier aggregation (CA), and the second range is used for UE not supporting CA; and when the UE supports CA, the start position that is determined by the entity at which the serving cell is located for the serving cell and that is used for selecting a C-RNTI and the interval range are both located within the first range; or when the UE does not support CA, the start position that is determined by the entity at which the serving cell is located for the serving cell and that is used for selecting a C-RNTI and the interval range are both located within the second range.

With reference to the first aspect, with reference to the first possible implementation manner of the first aspect, or with reference to the second possible implementation manner of the first aspect, in a third possible implementation manner of the first aspect, the UE supports CA, the serving cell is a primary component carrier (PCC) of the UE, and the method further includes: when a secondary component carrier (SCC) of the UE is activated, sending, by the entity at which the PCC is located, the selected C-RNTI to an entity at which the SCC is located.

With reference to the third possible implementation manner of the first aspect, in a fourth possible implementation manner of the first aspect, the method further includes: receiving, by the entity at which the PCC is located, C-RNTI reallocation request information sent by the entity at which the SCC is located, where the C-RNTI reallocation request information is used to request the entity at which the PCC is located to reallocate a C-RNTI to the UE when the entity at which the SCC is located determines that the C-RNTI allocated by the entity at which the PCC is located to the UE is allocated to another UE for use; and selecting, by the entity at which the PCC is located, at least two C-RNTIs for the UE according to the C-RNTI reallocation request information and sending the selected at least two C-RNTIs to the entity at which the SCC is located.

With reference to the fourth possible implementation manner of the first aspect, in a fifth possible implementation manner of the first aspect, the selecting, by the entity at which the PCC is located, at least two C-RNTIs for the UE includes: randomly selecting, by the entity at which the PCC is located, the at least two C-RNTIs for the UE from the interval range.

With reference to the fourth possible implementation manner of the first aspect or with reference to the fifth possible implementation manner of the first aspect, in a sixth possible implementation manner of the first aspect, the method further includes: receiving, by the entity at which the PCC is located, a C-RNTI selected by the entity at which the SCC is located from the at least two C-RNTIs; sending, by the entity at which the PCC is located, a reconfiguration message to the UE, where the reconfiguration message carries the C-RNTI selected by the entity at which the SCC is located; and releasing, by the entity at which the PCC is located, a C-RNTI, selected for the UE, other than the C-RNTI selected by the entity at which the SCC is located.

With reference to the first aspect, with reference to the first possible implementation manner of the first aspect, with reference to the second possible implementation manner of the first aspect, with reference to the third possible implementation manner of the first aspect, with reference to the fourth possible implementation manner of the first aspect, with reference to the fifth possible implementation manner of the first aspect, or with reference to the sixth possible implementation manner of the first aspect, in a seventh possible implementation manner of the first aspect, the interval range is preset or is determined by the entity at which the serving cell is located according to a quantity of UEs currently accessing the serving cell.

According to a second aspect, a cell radio network temporary identifier (C-RNTI) allocation method is provided and used to allocate a C-RNTI to user equipment (UE) supporting carrier aggregation (CA), where component carriers of the CA include a primary component carrier (PCC) and a secondary component carrier (SCC), and the method includes: receiving, by an entity at which the SCC is located, a C-RNTI sent by an entity at which the PCC is located, where the C-RNTI is selected by the entity at which the PCC is located for the UE from a C-RNTI interval range, a start position of the interval range is randomly determined, and the interval range is smaller than a C-RNTI value range; determining, by the entity at which the SCC is located, whether the C-RNTI is allocated to another UE for use; and allocating the C-RNTI to the UE when it is determined that the C-RNTI is not allocated to another UE for use.

With reference to the second aspect, in a first possible implementation manner of the second aspect, the C-RNTI is randomly selected by the entity at which the PCC is located for the UE from the interval range.

With reference to the second aspect or with reference to the first possible implementation manner of the second aspect, in a second possible implementation manner of the second aspect, the method further includes: requesting the entity at which the PCC is located to reallocate a C-RNTI to the UE when the entity at which the SCC is located determines that the C-RNTI is allocated to another UE for use; receiving, by the entity at which the SCC is located, at least two C-RNTIs reselected by the entity at which the PCC is located for the UE, and selecting, from the at least two C-RNTIs, a C-RNTI that is not allocated to another UE for use; and sending, by the entity at which the SCC is located, the selected C-RNTI to the entity at which the PCC is located and requesting the PCC to reallocate the selected C-RNTI to the UE.

With reference to the second possible implementation manner of the second aspect, in a third possible implementation manner of the second aspect, the requesting the entity at which the PCC is located to reallocate a C-RNTI to the UE when the entity at which the SCC is located determines that the C-RNTI is allocated to another UE for use includes: sending, by the entity at which the SCC is located, C-RNTI reallocation request information to the entity at which the PCC is located, where the C-RNTI reallocation request information is used to request the entity at which the PCC is located to reallocate a C-RNTI to the UE.

With reference to the second possible implementation manner of the second aspect or with reference to the third possible implementation manner of the second aspect, in a fourth possible implementation manner of the second aspect, the receiving, by the entity at which the SCC is located, at least two C-RNTIs reselected by the entity at which the PCC is located for the UE includes: receiving, by the entity at which the SCC is located, C-RNTI reallocation response information sent by the entity at which the PCC is located, where the C-RNTI reallocation response information includes the at least two C-RNTIs selected by the entity at which the PCC is located for the UE.

With reference to the second possible implementation manner of the second aspect, with reference to the third possible implementation manner of the second aspect, or with reference to the fourth possible implementation manner of the second aspect, in a fifth possible implementation manner of the second aspect, the at least two C-RNTIs are randomly selected by the entity at which the PCC is located for the UE from the interval range.

According to a third aspect, a cell radio network temporary identifier (C-RNTI) allocation device is provided, configured to allocate a C-RNTI to user equipment (UE). The device includes a determining unit, configured to, when the UE accesses a serving cell, randomly determine, for the serving cell from a C-RNTI value range, a start position for selecting a C-RNTI. The device also includes a selection unit, configured to select a C-RNTI for the UE from a C-RNTI interval range, where the interval range is smaller than the C-RNTI value range, and a start position of the interval range is the start position that is determined by the determining unit and that is used for selecting a C-RNTI. The device also includes an allocation unit, configured to allocate, to the UE, the C-RNTI selected by the selection unit.

With reference to the third aspect, in a first possible implementation manner of the third aspect, the selection unit is specifically configured to randomly select a C-RNTI for the UE from the interval range.

With reference to the third aspect or the first possible implementation manner of the third aspect, in second possible implementation manner of the third aspect, the C-RNTI value range includes a first range and a second range, where the first range is used for UE supporting carrier aggregation (CA), and the second range is used for UE not supporting CA; and when the UE supports CA, the start position that is determined by the determining unit for the serving cell and that is used for selecting a C-RNTI and the interval range for selecting, by the selection unit, a C-RNTI are both located within the first range; or when the UE does not support CA, the start position that is determined by the determining unit for the serving cell and that is used for selecting a C-RNTI and the interval range for selecting, by the selection unit, a C-RNTI are both located within the second range.

With reference to the third aspect, with reference to the first possible implementation manner of the third aspect, or with reference to the second possible implementation manner of the third aspect, in a third possible implementation manner of the third aspect, the UE supports CA, the serving cell is a primary component carrier (PCC) of the UE, and the allocation device further includes: an interface unit, where the interface unit is configured to send the selected C-RNTI to an entity at which a secondary component carrier (SCC) is located when the SCC of the UE is activated.

With reference to the third possible implementation manner of the third aspect, in a fourth possible implementation manner of the third aspect, the interface unit is further configured to receive C-RNTI reallocation request information sent by the entity at which the SCC is located, where the C-RNTI reallocation request information is used to request the entity at which the PCC is located to reallocate a C-RNTI to the UE when the entity at which the SCC is located determines that the C-RNTI allocated by the entity at which the PCC is located to the UE is allocated to another UE for use; the selection unit is further configured to select at least two C-RNTIs for the UE according to the C-RNTI reallocation request information; and the interface unit is further configured to send the selected at least two C-RNTIs to the entity at which the SCC is located.

With reference to the fourth possible implementation manner of the third aspect, in a fifth possible implementation manner of the third aspect, the selection unit is specifically configured to randomly select the at least two C-RNTIs for the UE from the interval range.

With reference to the fourth possible implementation manner of the third aspect or with reference to the fifth possible implementation manner of the third aspect, in a sixth possible implementation manner of the third aspect, the allocation device further includes: a release unit, where the interface unit is further configured to receive a C-RNTI selected by the entity at which the SCC is located from the at least two C-RNTIs; the allocation unit is further configured to send a reconfiguration message to the UE, where the reconfiguration message carries the C-RNTI selected by the entity at which the SCC is located; and the release unit is configured to release a C-RNTI, selected for the UE, other than the C-RNTI selected by the entity at which the SCC is located.

With reference to the third aspect, with reference to the first possible implementation manner of the third aspect, with reference to the second possible implementation manner of the third aspect, with reference to the third possible implementation manner of the third aspect, with reference to the fourth possible implementation manner of the third aspect, with reference to the fifth possible implementation manner of the third aspect, or with reference to the sixth possible implementation manner of the third aspect, in a seventh possible implementation manner of the third aspect, the interval range is preset or is determined by the entity at which the serving cell is located according to a quantity of UEs currently accessing the serving cell.

According to a fourth aspect, a cell radio network temporary identifier (C-RNTI) allocation device is provided and configured to allocate a C-RNTI to user equipment (UE) supporting carrier aggregation (CA), where component carriers of the CA include a primary component carrier (PCC) and a secondary component carrier (SCC). The device includes: an interface unit, configured to receive a C-RNTI sent by an entity at which the PCC is located, where the C-RNTI is selected by the entity at which the PCC is located for the UE from a C-RNTI interval range, a start position of the interval range is randomly determined, and the interval range is smaller than a C-RNTI value range. The device also includes a determining unit, configured to determine whether the C-RNTI received by the interface unit is allocated to another UE for use. The device also includes an allocation unit, configured to allocate the C-RNTI to the UE when the determining unit determines that the C-RNTI is not allocated to another UE for use.

With reference to the fourth aspect, in a first possible implementation manner of the fourth aspect, the C-RNTI is randomly selected by the entity at which the PCC is located for the UE from the interval range.

With reference to the fourth aspect or with reference to the first possible implementation manner of the fourth aspect, in a second possible implementation manner of the fourth aspect, the allocation device further includes: a trigger unit and a selection unit, where the trigger unit is configured to trigger requesting the entity at which the PCC is located to reallocate a C-RNTI to the UE when the determining unit determines that the C-RNTI is allocated to another UE for use; the interface unit is further configured to receive at least two C-RNTIs reselected by the entity at which the PCC is located for the UE; the selection unit is configured to select, from the at least two C-RNTIs, a C-RNTI that is not allocated to another UE for use; and the interface unit is further configured to send the selected C-RNTI to the entity at which the PCC is located and request the PCC to reallocate the selected C-RNTI to the UE.

With reference to the second possible implementation manner of the fourth aspect, in a third possible implementation manner of the fourth aspect, the interface unit is specifically configured to send C-RNTI reallocation request information to the entity at which the PCC is located, where the C-RNTI reallocation request information is used to request the entity at which the PCC is located to reallocate a C-RNTI to the UE.

With reference to the second possible implementation manner of the fourth aspect or with reference to the third possible implementation manner of the fourth aspect, in a fourth possible implementation manner of the fourth aspect, the interface unit is specifically configured to receive C-RNTI reallocation response information sent by the entity at which the PCC is located, where the C-RNTI reallocation response information includes the at least two C-RNTIs selected by the entity at which the PCC is located for the UE.

With reference to the second possible implementation manner of the fourth aspect, with reference to the third possible implementation manner of the fourth aspect, or with reference to the fourth possible implementation manner of the fourth aspect, in a fifth possible implementation manner of the fourth aspect, the at least two C-RNTIs are randomly selected by the entity at which the PCC is located for the UE from the interval range.

According to a fifth aspect, a cell radio network temporary identifier (C-RNTI) allocation device is provided, configured to allocate a C-RNTI to user equipment (UE). The device includes a processor, configured to: randomly determine, when the UE accesses a serving cell, for the serving cell from a C-RNTI value range, a start position for selecting a C-RNTI; and select a C-RNTI for the UE from a C-RNTI interval range, where the interval range is smaller than the C-RNTI value range, and a start position of the interval range is the determined start position for selecting a C-RNTI. The device also includes a signal transmitter, configured to allocate the selected C-RNTI to the UE.

With reference to the fifth aspect, in a first possible implementation manner of the fifth aspect, the processor is specifically configured to randomly select a C-RNTI for the UE from the interval range.

With reference to the fifth aspect or the first possible implementation manner of the fifth aspect, in second possible implementation manner of the fifth aspect, the C-RNTI value range includes a first range and a second range, where the first range is used for UE supporting carrier aggregation (CA), and the second range is used for UE not supporting CA; and when the UE supports CA, the start position that is determined by the processor for the serving cell and that is used for selecting a C-RNTI and the interval range are both located within the first range; or when the UE does not support CA, the start position that is determined by the processor for the serving cell and that is used for selecting a C-RNTI and the interval range are both located within the second range.

With reference to the fifth aspect, with reference to the first possible implementation manner of the fifth aspect, or with reference to the second possible implementation manner of the fifth aspect, in a third possible implementation manner of the fifth aspect, the UE supports CA, the serving cell is a primary component carrier (PCC) of the UE, and the processor is further configured to send the selected C-RNTI to an entity at which an SCC is located when the SCC is activated.

With reference to the third possible implementation manner of the fifth aspect, in a fourth possible implementation manner of the fifth aspect, the allocation device further includes: an interface, configured to exchange information with the entity at which the SCC is located, where the interface is configured to receive C-RNTI reallocation request information sent by the entity at which the SCC is located, where the C-RNTI reallocation request information is used to request an entity at which the PCC is located to reallocate a C-RNTI to the UE when the entity at which the SCC is located determines that the C-RNTI allocated by the entity at which the PCC is located to the UE is allocated to another UE for use; the processor is further configured to select at least two C-RNTIs for the UE according to the C-RNTI reallocation request information; and the interface is further configured to send the selected at least two C-RNTIs to the entity at which the SCC is located.

With reference to the fourth possible implementation manner of the fifth aspect, in a fifth possible implementation manner of the fifth aspect, the processor is specifically configured to randomly select the at least two C-RNTIs for the UE from the interval range.

With reference to the fourth possible implementation manner of the fifth aspect or with reference to the fifth possible implementation manner of the fifth aspect, in a sixth possible implementation manner of the fifth aspect, the interface is further configured to receive a C-RNTI selected by the entity at which the SCC is located from the at least two C-RNTIs; the signal transmitter is further configured to send a reconfiguration message to the UE, where the reconfiguration message carries the C-RNTI selected by the entity at which the SCC is located; and the processor is further configured to release a C-RNTI, selected for the UE, other than the C-RNTI selected by the entity at which the SCC is located.

With reference to the fifth aspect, with reference to the first possible implementation manner of the fifth aspect, with reference to the second possible implementation manner of the fifth aspect, with reference to the third possible implementation manner of the fifth aspect, with reference to the fourth possible implementation manner of the fifth aspect, with reference to the fifth possible implementation manner of the fifth aspect, or with reference to the sixth possible implementation manner of the fifth aspect, in a seventh possible implementation manner of the fifth aspect, the interval range is preset or is determined by the entity at which the serving cell is located according to a quantity of UEs currently accessing the serving cell.

According to a sixth aspect, a cell radio network temporary identifier (C-RNTI) allocation device is provided and configured to allocate a C-RNTI to user equipment (UE) supporting carrier aggregation (CA), where component carriers of the CA include a primary component carrier (PCC) and a secondary component carrier (SCC). The device includes an interface, configured to exchange information with an entity at which the PCC is located, and specifically configured to receive a C-RNTI sent by the entity at which the PCC is located, where the C-RNTI is selected by the entity at which the PCC is located for the UE from a C-RNTI interval range, a start position of the interval range is randomly determined, and the interval range is smaller than a C-RNTI value range. The device also includes a processor, configured to determine whether the C-RNTI is allocated to another UE for use. The device also includes a signal transmitter, configured to allocate the C-RNTI to the UE when the C-RNTI is not allocated to another UE for use.

With reference to the sixth aspect, in a first possible implementation manner of the sixth aspect, the C-RNTI is randomly selected by the entity at which the PCC is located for the UE from the interval range.

With reference to the sixth aspect or with reference to the first possible implementation manner of the sixth aspect, in a second possible implementation manner of the sixth aspect, the processor is further configured to trigger requesting the entity at which the PCC is located to reallocate a C-RNTI to the UE when it is determined that the C-RNTI is allocated to another UE for use. The interface is further configured to: receive at least two C-RNTIs reselected by the entity at which the PCC is located for the UE, and select, from the at least two C-RNTIs, a C-RNTI that is not allocated to another UE for use; and send the selected C-RNTI to the entity at which the PCC is located and request the PCC to reallocate the selected C-RNTI to the UE.

With reference to the second possible implementation manner of the sixth aspect, in a third possible implementation manner of the sixth aspect, the interface is specifically configured to send C-RNTI reallocation request information to the entity at which the PCC is located, where the C-RNTI reallocation request information is used to request the entity at which the PCC is located to reallocate a C-RNTI to the UE.

With reference to the second possible implementation manner of the sixth aspect or with reference to the third possible implementation manner of the sixth aspect, in a fourth possible implementation manner of the sixth aspect, the interface is specifically configured to receive C-RNTI reallocation response information sent by the entity at which the PCC is located, where the C-RNTI reallocation response information includes the at least two C-RNTIs allocated by the entity at which the PCC is located to the UE.

With reference to the second possible implementation manner of the sixth aspect, with reference to the third possible implementation manner of the sixth aspect, or with reference to the fourth possible implementation manner of the sixth aspect, in a fifth possible implementation manner of the sixth aspect, the at least two C-RNTIs are randomly selected by the entity at which the PCC is located for the UE from the interval range.

Beneficial effects of the embodiments of the present application are:

In the embodiments of the present application, when UE accesses a serving cell, an entity at which the serving cell is located randomly determines, for the serving cell from a C-RNTI value range, a start position for selecting a C-RNTI; the entity at which the serving cell is located selects a C-RNTI for the UE from a C-RNTI interval range, where the interval range is smaller than the C-RNTI value range, and a start position of the interval range is the determined start position for selecting a C-RNTI; and the entity at which the serving cell is located allocates the selected C-RNTI to the UE. In this way, when the UE accesses the serving cell, the entity at which the serving cell is located randomly determines the start position for selecting a C-RNTI, selects a C-RNTI for the UE within a C-RNTI interval range starting from the start position, and allocates the selected C-RNTI to the UE. That is, when allocating the C-RNTI to the UE, the entity at which the serving cell is located randomizes the start position of allocation performed by the entity and uses the start position as a start position of an allocation interval, to randomize allocation of the C-RNTI. Because each time each cell allocates a C-RNTI to the UE, a probability of repetition of start positions of allocation intervals is lowered, a probability that a conflict occurs when a C-RNTI is allocated to the UE is also lowered.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION OF ILLUSTRATIVE EMBODIMENTS

The following further describes the embodiments of the present application in detail with reference to this specification. Apparently, the described embodiments are merely some but not all of the embodiments of the present application. All other embodiments obtained by a person of ordinary skill in the art based on the embodiments of the present application without creative efforts shall fall within the protection scope of the present application.

A C-RNTI is an identifier added to a header of a Media Access Control (MAC) packet data unit (PDU) and is used to distinguish different UEs. Currently, a length of the C-RNTI is 16 bits, and a value range is 0 to 65535.

In a CA scenario, a PCC and an SCC are both used for data transmission of same UE, and C-RNTIs used for the UE need to keep consistent. A C-RNTI of the UE is allocated by an entity at which the PCC is located to the UE when the UE accesses the PCC. When the SCC is activated, the SCC needs to use the C-RNTI allocated by the PCC. However, the SCC may be used as a PCC of another UE, and allocates the C-RNTI to another UE, causing a C-RNTI conflict.

Currently, CA has two implementation manners: one is fixed configuration CA, and the other one is flexible configuration CA (FlexibleCA, FCA). In the fixed configuration CA, a PCC and an SCC are both predetermined, and for example, the fixed configuration CA is implemented by using a CA cell set. In this case, because CCs are all determined, a value range (such as 0 to 65535) of the C-RNTI may be divided into several interval ranges. Different interval ranges do not overlap and are separately allocated to these CCs. Therefore, a C-RNTI conflict does not occur. However, as regards an FCA manner, because an SCC is flexibly selected when CA is triggered, a manner used in the fixed configuration CA cannot be used to ensure that no C-RNTI conflict occurs.

Therefore, this application proposes a solution for randomly allocating a C-RNTI. C-RNTI allocation is divided into a cell-level C-RNTI selection process and a UE-level C-RNTI selection process. One or both of the two processes are randomized, to lower a probability that a C-RNTI conflict occurs.

Figure 1:
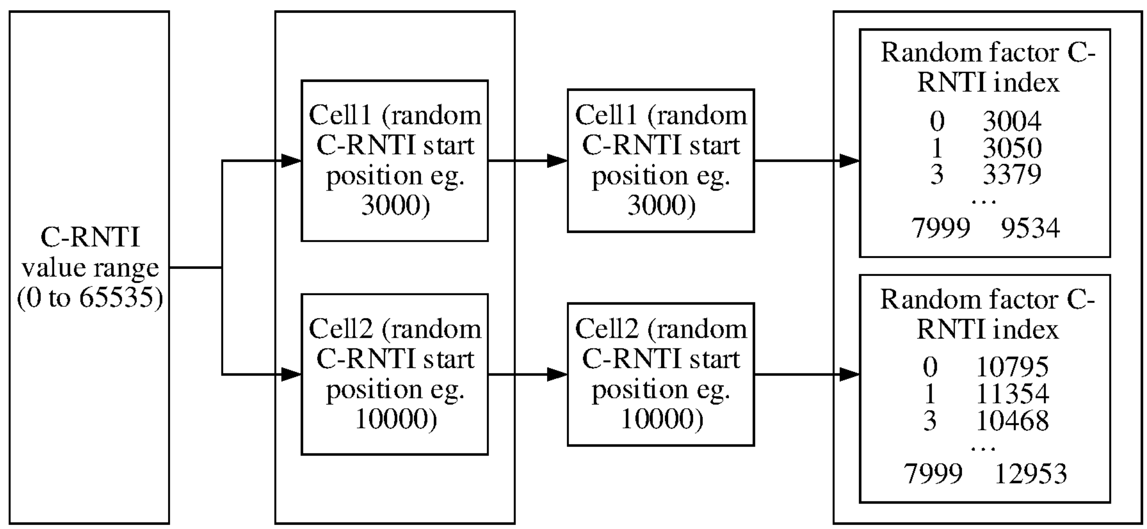
FIG. 1 is a schematic flowchart of a C-RNTI allocation method according to the present application.

For example, referring to FIG. 1, FIG. 1 is a schematic diagram of a C-RNTI allocation method according to an embodiment of the present application. As shown in FIG. 1, when a C-RNTI is selected for UE within a cell 1 (Cell1), a start position, such as 3000, for selecting a C-RNTI is randomly determined from a value range (0 to 65535), and an interval range for selection is set. The interval range may be preset according to needs or a current network situation and may be adjusted according to a network situation. For example, the interval range is determined according to a quantity of UEs currently accessing the Cell1. For example, a greater quantity of UEs indicates a larger allocated interval range. Herein, a preset interval range 8000 is used as an example, and certainly, is merely used for giving an example, and the present application is not limited thereto. In this case, a range of a C-RNTI allocated to UE in the Cell1 is 3000 to 10999. Subsequently, a C-RNTI is allocated to the UE within the range. When a C-RNTI is selected for UE within a cell 2 (Cell2), a same manner is also followed. However, because a start position for selecting a C-RNTI is random, in this case, there is a small probability for the Cell2 to select a start position the same as that for the Cell1. For example, in this embodiment, a start position, selected for the Cell2, for selecting a C-RNTI is 10000. In this case, a range of a C-RNTI allocated to UE in the Cell2 is 10000 to 17999. In this case, although the Cell1 and the Cell2 have an overlapping range for selecting a C-RNTI, the overlapping range becomes smaller compared with a situation in which both the Cell1 and the Cell2 select C-RNTIs within a whole range. Therefore, a probability of a C-RNTI conflict is lowered. Further, when a C-RNTI is selected in each cell and allocated to UE, a random manner may also be used. In this way, the probability of a C-RNTI conflict is further lowered.

Figure 2:
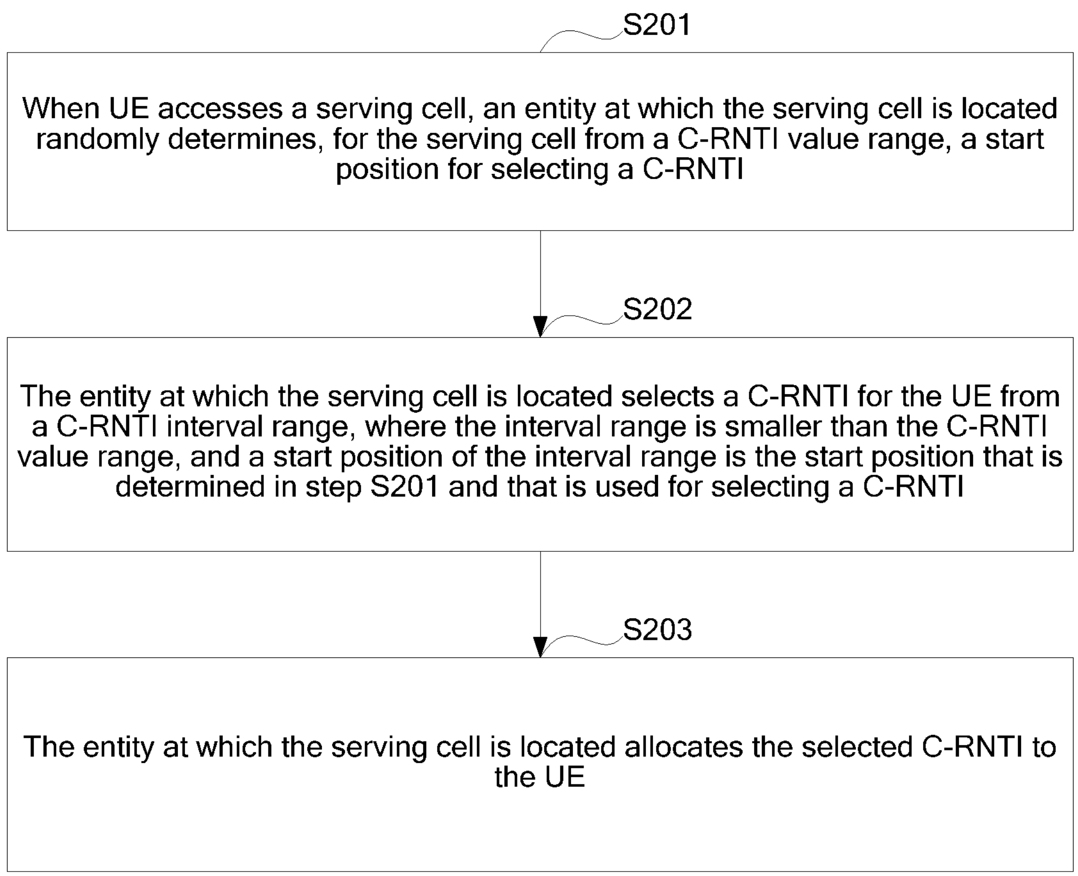
FIG. 2 is a schematic flowchart of a C-RNTI allocation method according to the present application.

Referring to FIG. 2, FIG. 2 is a schematic flowchart of a C-RNTI allocation method according to an embodiment of the present application. The method is used to allocate a C-RNTI to UE and may include the following steps.

S201: When the UE accesses a serving cell, an entity at which the serving cell is located randomly determines, for the serving cell from a C-RNTI value range, a start position for selecting a C-RNTI.

S202: The entity at which the serving cell is located selects a C-RNTI for the UE from a C-RNTI interval range, where the interval range is smaller than the C-RNTI value range, and a start position of the interval range is the start position that is determined in step S201 and that is used for selecting a C-RNTI.

S203: The entity at which the serving cell is located allocates the selected C-RNTI to the UE.

It can be known that in the foregoing embodiment, when allocating the C-RNTI to the UE, the entity at which the serving cell is located randomizes the start position of allocation performed by the entity and uses the start position as a start position of an allocation interval, to randomize allocation of the C-RNTI. In this way, each time each cell allocates a C-RNTI to UE, a probability of repetition of start positions of allocation intervals is lowered, so that a probability that a conflict occurs when a C-RNTI is allocated to UE is also lowered.

It should be noted that in this application, an operation executed by a cell (such as a PCC and an SCC) on UE, such as an operation of allocating a C-RNTI to the UE, refers to an operation executed by an entity at which the cell is located on the UE. The entity at which the cell is located may be an entity, such as a base station or a baseband board, at which the cell is located, or may be a processor for controlling the cell. To facilitate understanding interaction between the PCC and the SCC, what an entity specifically is may be understood as follows: for example, when the PCC and the SCC are cells served by different base stations, an entity at which the PCC is located may be a base station at which the PCC is located, and an entity at which the SCC is located may be a base station at which the SCC is located. When the PCC and the SCC are cells served by a same base station, the entity at which the PCC is located may be a baseband board at which the PCC is located, and the entity at which the SCC is located may be a baseband board at which the SCC is located. When the PCC and the SCC are a same baseband board deployed under a same base station, the entity at which the PCC is located may be a processor controlling the PCC, and the entity at which the SCC is located may be a processor controlling the SCC. Certainly, it can also be considered uniformly that the entity at which the PCC is located is a processor controlling the PCC, and the entity at which the SCC is located is a processor controlling the SCC.

In the foregoing step S201, that the UE accesses the serving cell may refer to that the UE accesses the serving cell in a reestablishment manner or may refer to that the UE accesses the serving cell in a handover manner.

In addition, the process in which an entity at which the serving cell is located randomly determines, for the serving cell from a C-RNTI value range, a start position for selecting a C-RNTI may be described as follows by using an example:

Referring to FIG. 1, for example, if the C-RNTI value range is 0~65535, a start position that is randomly determined by an entity at which the serving cell Cell1 is located, for example, a base station, for the serving cell Cell1 from 0 to 65535 and that is used for selecting a C-RNTI is 3000. For another example, a start position that is randomly determined by an entity at which the serving cell Cell2 of another UE for the serving cell Cell2 from 0 to 65535 and that is used for selecting a C-RNTI is 10000. When the Cell2 is the SCC of the UE, and the serving cell Cell1 of the UE is the PCC, a process in which the Cell1 allocates a C-RNTI to the UE and a process in which the Cell2 allocates a C-RNTI to another UE are both performed in the foregoing random manner. In this way, a probability of a conflict of the allocated C-RNTI is lowered.

In this way, because start positions that are randomly determined by different serving cells and that are used for selecting a C-RNTI are different, when a particular serving cell is used as an SCC of another serving cell, a probability that a conflict occurs in the C-RNTIs allocated by these serving cells to the UE is lowered.

In the foregoing step S202, the entity at which the PCC is located determines a C-RNTI interval range from the C-RNTI value range by using the start position that is determined by the PCC and that is used for selecting a C-RNTI as a start position.

The determined C-RNTI interval range is smaller than the C-RNTI value range. A length of the C-RNTI interval range may be determined according to a quantity of UEs accessing the PCC or may be preset.

Referring to FIG. 1, for example, a length of the interval range for selecting a C-RNTI is preset to 8000. Therefore, it can be known with reference to that the start position that is randomly determined for the Cell1 from 0 to 65535 and that is used for selecting a C-RNTI is 3000 that an interval range for selecting a C-RNTI by the Cell1 is 3000 to 10999. It can be known with reference to that the start position that is randomly determined for the Cell2 from 0 to 65535 and that is used for selecting a C-RNTI is 10000 that an interval range for selecting a C-RNTI by the Cell2 is 10000 to 17999. For another example, it is determined, according to a quantity of UEs accessing the Cell1 or Cell2, that a length of an interval range for selecting a C-RNTI by the cell is 10000. Therefore, it can be known with reference to that the start position that is randomly determined for the Cell1 from 0 to 65535 and that is used for selecting a C-RNTI is 3000 that an interval range for selecting a C-RNTI by the Cell1 is 3000 to 12999. It can be known with reference to that the start position that is randomly determined for the Cell2 from 0 to 65535 and that is used for selecting a C-RNTI is 10000 that an interval range for selecting a C-RNTI by the Cell2 is 10000 to 19999.

In this way, the entity at which the Cell1 is located selects a C-RNTI for the UE from 3000 to 10999, and the entity at which the Cell2 is located selects a C-RNTI for another UE from 10000 to 19999. When the Cell2 is used as an SCC of the Cell1, a probability that a conflict occurs between the C-RNTI allocated by the entity at which the Cell1 is located to the UE and the C-RNTI allocated by the entity at which the Cell2 is located to another UE is lowered.

Optionally, the entity at which the serving cell is located may randomly select a C-RNTI for the UE from the determined C-RNTI interval range. In this way, a probability of a C-RNTI conflict may be further lowered.

Specifically, a random selection manner in this embodiment of the present application may be indexed by using a random factor according to a set indexing manner, to obtain a random selection result. The random factor may be, for example, an instance number of the UE or may be a random number randomly produced by a random factor producer. This is not limited in the present application.

Optionally, a C-RNTI range may be further divided into a first range used for UEs supporting CA and a second range used for UEs not supporting CA. In this way, when a C-RNTI is allocated to UE supporting CA, the C-RNTI is selected within the first range. When a C-RNTI is allocated to UE not supporting CA, the C-RNTI is selected within the second range. In this way, a conflict of C-RNTIs of UEs supporting CA and UEs not supporting CA may be reduced, and a probability of a C-RNTI conflict is further lowered.

In this case, when the UE supports CA, a start position that is determined by an entity at which a serving cell of the UE is located for the serving cell and that is used for selecting a C-RNTI and an interval range are both located within the first range. When the UE does not support CA, a start position that is determined by an entity at which a serving cell of the UE is located for the serving cell and that is used for selecting a C-RNTI and an interval range are both located within the second range.

For example, if the C-RNTI value range is 0 to 65535, the entity at which the serving cell is located obtains 5000 to 15000 by dividing 0 to 65535, to allocate 5000 to 15000 to UE supporting CA. That is, the entity at which the serving cell is located selects a C-RNTI from a C-RNTI interval range 5000 to 15000, to allocate the C-RNTI to UE supporting CA.

It should be noted that a manner of obtaining, by the entity at which the serving cell is located, the first range and the second range by dividing the C-RNTI value range may include but is not limited to:

The entity at which the serving cell is located divides the C-RNTI value range into two ranges, respectively the first range and the second range, to be respectively used for UE supporting CA and UE not supporting CA.

Alternatively, the entity at which the serving cell is located divides the C-RNTI value range into multiple ranges. One part of the multiple ranges is selected for UE supporting CA, and the other remaining part is used for UE supporting non-CA.

Alternatively, the entity at which the serving cell is located divides the C-RNTI value range according to a set ratio, such as 2:1.

For example, the C-RNTI value range (0 to 65535) is divided into three interval ranges (quantities of C-RNTIs within different interval ranges may be the same or may be different). Two interval ranges are used for UE supporting CA, and the remaining interval range is used for UE supporting non-CA.

It should be noted that C-RNTI values of each interval range may be continuous or may be discontinuous. This is not limited herein.

When the UE in the foregoing embodiment supports CA, the start position selected in the foregoing step S201 is selected within the first range, and the interval range of the C-RNTI selected for the UE in step S202 is within the first range. That is, randomly determining, by an entity at which the serving cell is located, for the serving cell from a C-RNTI value range, a start position for selecting a C-RNTI includes: randomly determining, by the entity at which the serving cell is located, a start position for selecting a C-RNTI for the serving cell from the first range. For example, a start position, such as 7000, for selecting a C-RNTI is randomly determined from 5000 to 15000.

When the UE in the foregoing embodiment does not support CA, the start position selected in the foregoing step S201 is selected within the second range, and the interval range of the C-RNTI selected for the UE in step S202 is within the second range. In the foregoing embodiment, when the UE supports CA, and the serving cell is the PCC of the UE, when the SCC is activated, the entity at which the PCC is located sends to the entity at which the SCC is located a C-RNTI allocated to the UE. For example, intra-site CA involves information transfer between boards, and in this case, transfer may be performed by using an inter-board interface. Inter-site CA involves information transfer between base stations, and in this case, transfer may be performed by using an inter-station interface. For example, information transfer is implemented by using an X2 interface between base stations in an LTE network, or is implemented by using an S1 interface via a core network.

Figure 3:
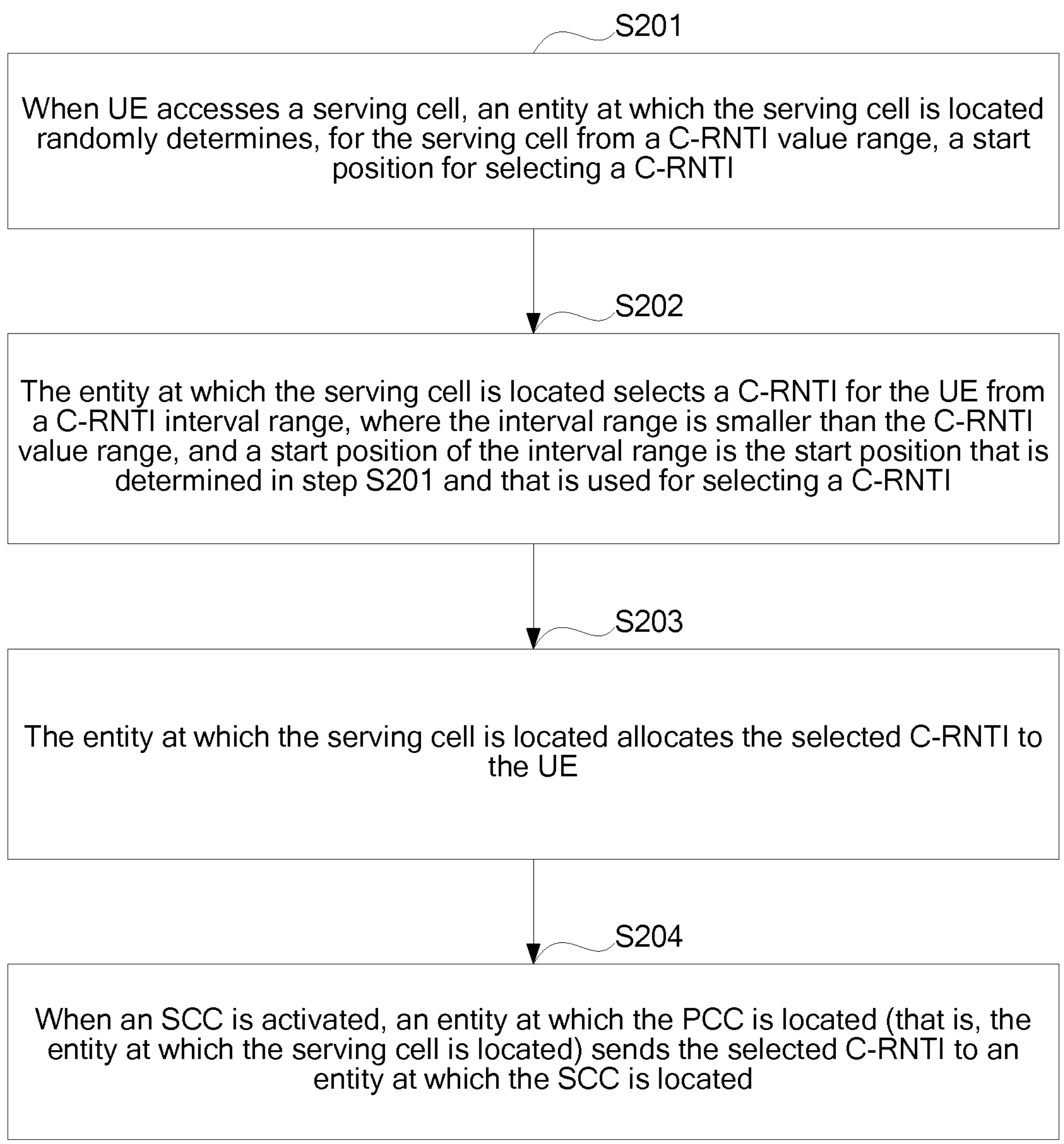
FIG. 3 is a schematic flowchart of a C-RNTI allocation method according to the present application.

Referring to FIG. 3, in this case, the foregoing method may further include:

S204: When an SCC is activated, an entity at which the PCC is located (that is, the entity at which the serving cell is located) sends the selected C-RNTI to an entity at which the SCC is located.

It should be noted that the entity at which the PCC is located and the entity at which the SCC is located may be a same base station or may be different base stations.

If the entity at which the PCC is located and the entity at which the SCC is located are a same base station, the entity at which the PCC is located sends the selected C-RNTI to the entity at which the SCC is located mainly in a manner of data transmission between baseband boards. If the entity at which the PCC is located and the entity at which the SCC is located are not a same base station, the entity at which the PCC is located sends the selected C-RNTI to the entity at which the SCC is located mainly in a manner of data transmission between base stations.

Figure 4:
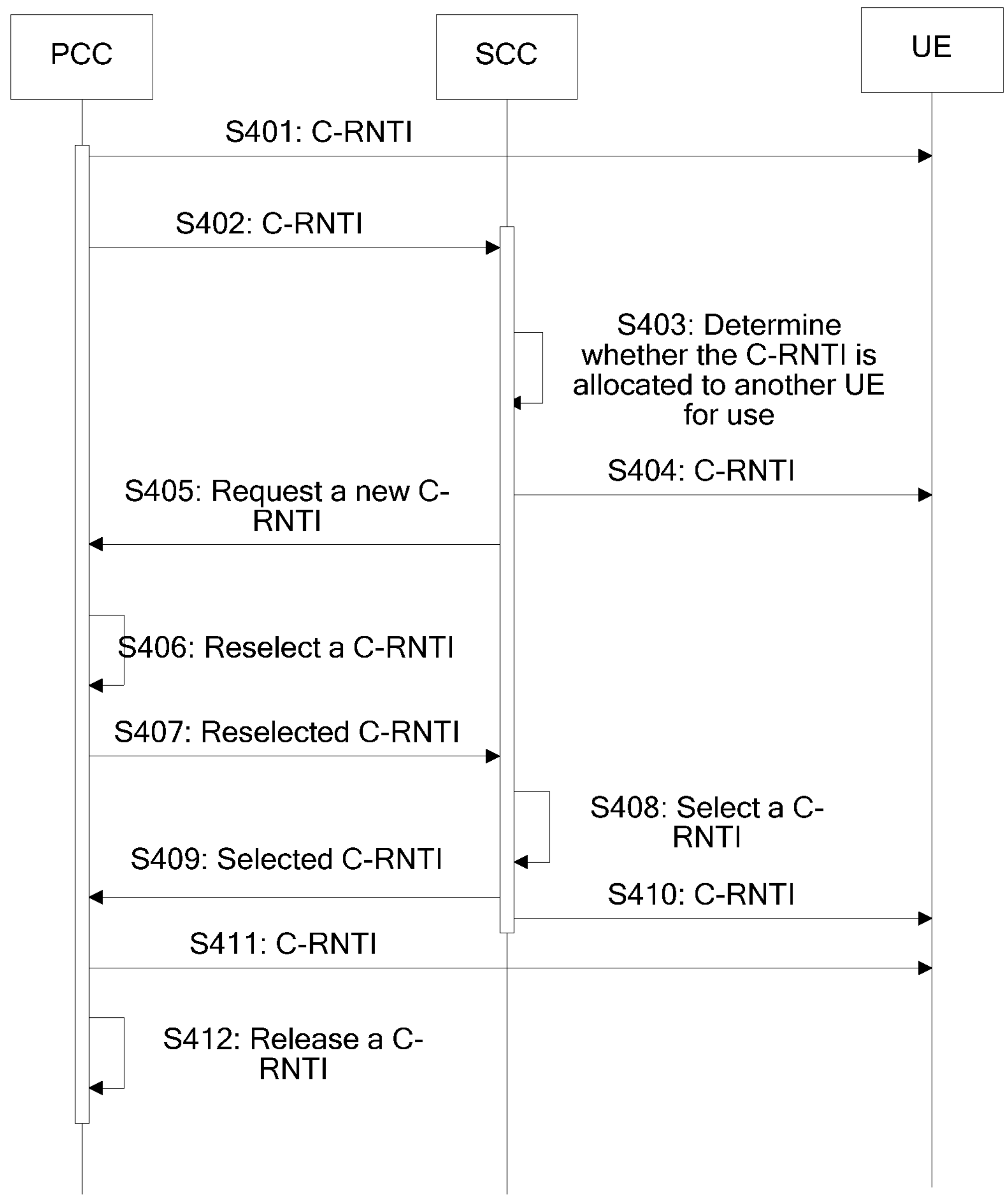
FIG. 4 is a schematic flowchart of a C-RNTI allocation method according to the present application.

When the entity at which the SCC is located receives a C-RNTI sent by the entity at which the PCC is located, if it is found that the C-RNTI is not allocated to another UE for use, the C-RNTI may be directly used. That is, the C-RNTI is allocated to the UE. If it is found that the C-RNTI is allocated to another UE for use, the entity at which the SCC is located may request a new C-RNTI from the entity at which the PCC is located. As shown in FIG. 4, in this case, the foregoing method may further include:

S401: The entity at which the PCC is located selects, by using the method shown in FIG. 2, the C-RNTI allocated to the UE, and sends the C-RNTI to the UE.

S402: When the SCC is activated, the entity at which the PCC is located sends the C-RNTI allocated to the UE to the SCC. There may be one or more SCCs.

S403: When receiving the C-RNTI sent by the entity at which the PCC is located, the entity at which the SCC is located determines whether the C-RNTI is allocated to another UE for use. When the C-RNTI is not allocated to another UE for use, execute step S404: Allocate the C-RNTI to the UE. When the C-RNTI is allocated to another UE for use, execute step S405: Request a new C-RNTI from entity at which the PCC is located, for example, send C-RNTI reallocation request information.

The C-RNTI reallocation request information is used to request the entity at which the PCC is located to reallocate a C-RNTI to the UE when the entity at which the SCC is located determines that the C-RNTI allocated by the entity at which the PCC is located to the UE is allocated to another UE for use.

S406: When receiving the C-RNTI reallocation request information from the entity at which the SCC is located, the entity at which the PCC is located reselects a C-RNTI for the UE.

S407: The entity at which the PCC is located sends the selected C-RNTI to the entity at which the SCC is located.

In this case, the entity at which the SCC is located may execute the foregoing steps S403 to S405 again, to determine whether the newly received C-RNTI is allocated to another UE for use and execute a corresponding operation according to a determining result.

In the foregoing step S406, because the entity at which the PCC is located receives the C-RNTI reallocation request information sent by the entity at which the SCC is located, it indicates that the C-RNTI allocated to the UE is allocated by the entity at which the SCC is located to another UE, and a C-RNTI conflict occurs. To lower a probability of reoccurrence of a C-RNTI conflict, in this case, the entity at which the PCC is located may reselect at least two C-RNTIs to be selected by the SCC. In this way, a probability that information is frequently exchanged between the entity at which the PCC is located and the entity at which the SCC is located because the newly selected C-RNTI cannot be used may be lowered. A quantity of reselected C-RNTIs may be set according to requirements of an operator or according to analysis of current network data, and for example, may be set to 2 to 5.

It can also be limited in this embodiment of the present application that the entity at which the PCC is located randomly selects at most N C-RNTIs for the UE, to prevent one UE from occupying excessive C-RNTIs. A value range of N is greater than 2 and is less than m, and m may be determined according to needs.

In addition, regardless of whether one or more C-RNTIs are reselected, random selection may be performed in the manner shown in FIG. 2. In this way, a probability that a conflict occurs in the reselected C-RNTIs is greatly lowered. Therefore, if reselection is performed in the manner shown in FIG. 2, only one C-RNTI or two C-RNTIs may be selected and provided to the SCC. In a word, the quantity may be lowered compared with a situation in which reselection is performed not in the manner shown in FIG. 2. Certainly, selection may be performed not in the manner shown in FIG. 2, but merely two or more C-RNTIs are randomly selected from the C-RNTI value range and are provided to the SCC for selection.

When multiple C-RNTIs are provided by the PCC to the SCC again, the foregoing method further includes the following steps.

S408: The entity at which the SCC is located selects a C-RNTI from the at least two C-RNTIs sent by the entity at which the PCC is located, where the C-RNTI is a C-RNTI not allocated to another UE for use. It should be noted that when more than one C-RNTI can be selected, one of the C-RNTIs is randomly selected as a C-RNTI to be allocated to the UE.

S409: The entity at which the SCC is located sends the selected C-RNTI to the entity at which the PCC is located.

S410: The entity at which the SCC is located allocates the selected C-RNTI to the UE.

S411: The entity at which the PCC is located allocates the C-RNTI selected by the entity at which the SCC is located to the UE, for example, may send a reconfiguration message to the UE.

The reconfiguration message carries the C-RNTI selected by the entity at which the SCC is located.

It should be noted that there is no requirement for a sequence between the foregoing steps S409 and S410: Either of S409 and S410 may be first performed, or S409 and S410 may be simultaneously performed. In addition, after the entity at which the PCC is located allocates the C-RNTI selected by the entity at which the SCC is located to the UE, the entity at which the SCC is located may allocate the C-RNTI to the UE according to feedback of the PCC. This is not limited in the present application.

S412: The entity at which the PCC is located releases another C-RNTI selected for the UE, that is, a C-RNTI other than the C-RNTI selected by the entity at which the SCC is located.

In the solution of this embodiment of the present application, when UE accesses a serving cell, an entity at which the serving cell is located randomly determines a start position for selecting a C-RNTI, selects a C-RNTI for the UE within a C-RNTI interval range starting from the start position, and allocates the selected C-RNTI to the UE. That is, when allocating the C-RNTI to the UE, the entity at which the serving cell is located randomizes the start position of allocation performed by the entity and uses the start position as a start position of an allocation interval, to randomize allocation of the C-RNTI. Because each time each cell allocates a C-RNTI to UE, a probability of repetition of start positions of allocation intervals is lowered, a probability that a conflict occurs when a C-RNTI is allocated to the UE is also lowered.

Figure 5:
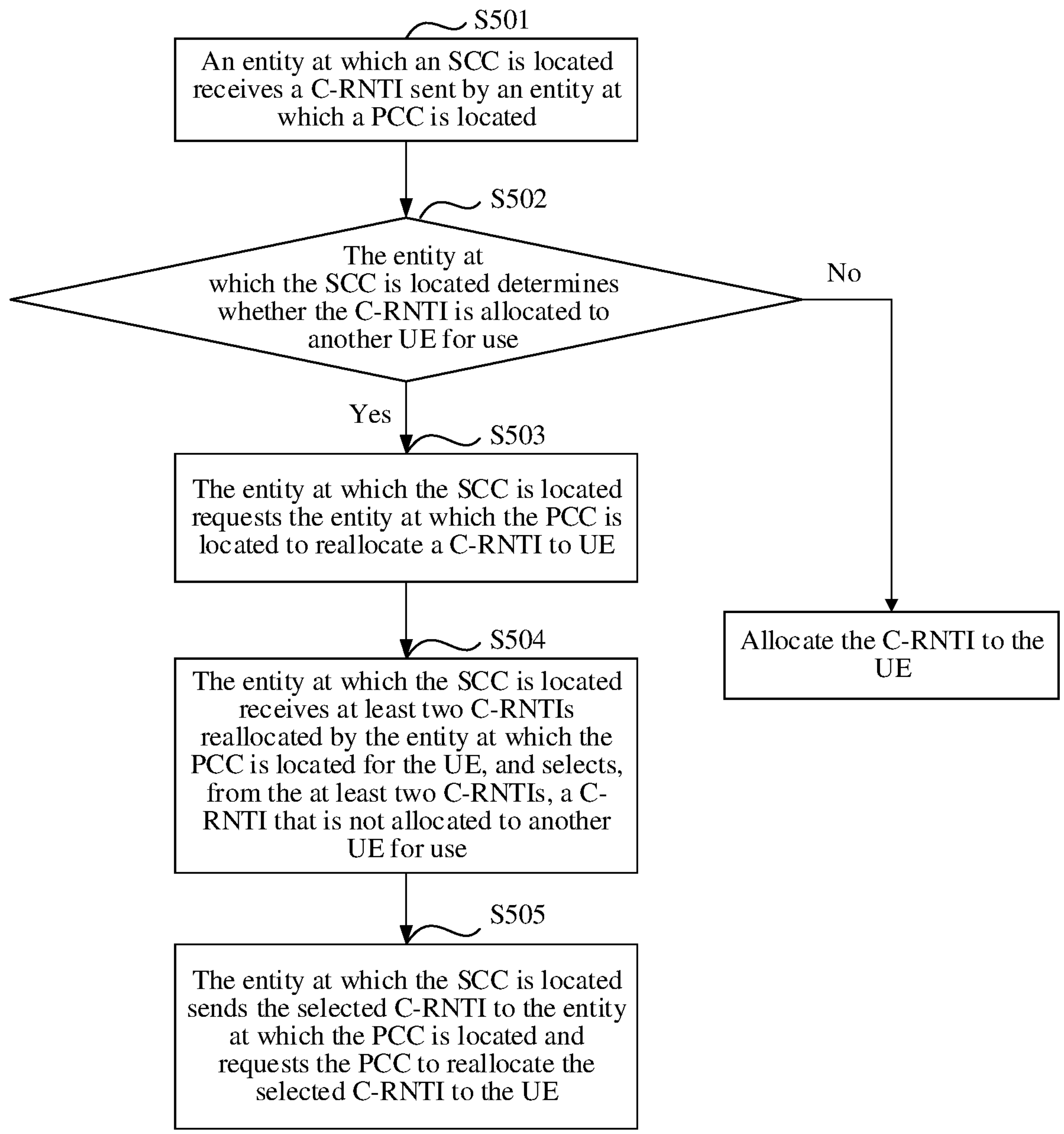
FIG. 5 is a schematic flowchart of a C-RNTI allocation method according to the present application.

FIG. 5 is a schematic flowchart of a C-RNTI allocation method according to an embodiment of the present application. An application scenario of this embodiment of the present application may be allocating a C-RNTI to user equipment (UE) supporting carrier aggregation (CA) based on S201 to S203. Component carriers of the CA include a primary component carrier (PCC) and a secondary component carrier (SCC). When the SCC is activated, an entity at which the PCC is located sends the selected C-RNTI to an entity at which the SCC is located, to execute the following operations:

S501: The entity at which the SCC is located receives a C-RNTI sent by the entity at which the PCC is located.

The C-RNTI is selected by the entity at which the PCC is located for the UE from a C-RNTI interval range. A start position of the interval range is randomly determined, and the interval range is smaller than a C-RNTI value range.

Optionally, the C-RNTI is randomly selected by the entity at which the PCC is located for the UE from the interval range.

S502: The entity at which the SCC is located determines whether the C-RNTI is allocated to another UE for use, and if the C-RNTI is not allocated to another UE for use, allocates the C-RNTI to the UE, or if the C-RNTI is allocated to another UE for use, executes S503.

In S502, if the entity at which the SCC is located determines that the C-RNTI is not allocated to another UE for use, it indicates that a C-RNTI allocation conflict does not occur, and the C-RNTI is allocated to the UE.

S503: The entity at which the SCC is located requests the entity at which the PCC is located to reallocate a C-RNTI to the UE.

In S503, the entity at which the SCC is located sends C-RNTI reallocation request information to the entity at which the PCC is located.

The C-RNTI reallocation request information is used to request the entity at which the PCC is located to reallocate a C-RNTI to the UE.

S504: The entity at which the SCC is located receives at least two C-RNTIs reselected by the entity at which the PCC is located for the UE, and selects, from the at least two C-RNTIs, a C-RNTI that is not allocated to another UE for use.

In step S504, the entity at which the SCC is located receives C-RNTI reallocation response information sent by the entity at which the PCC is located.

The C-RNTI reallocation response information includes the at least two C-RNTIs selected by the entity at which the PCC is located for the UE.

The at least two C-RNTIs are randomly selected by the entity at which the PCC is located for the UE from the interval range.

S505: The entity at which the SCC is located sends the selected C-RNTI to the entity at which the PCC is located and requests the PCC to reallocate the selected C-RNTI to the UE.

In the solution of this embodiment of the present application, the entity at which the SCC is located receives a C-RNTI sent by the entity at which the PCC is located. The C-RNTI is selected by the entity at which the PCC is located for the UE from a C-RNTI interval range. A start position of the interval range is randomly determined, and the interval range is smaller than a C-RNTI value range. The entity at which the SCC is located determines whether the C-RNTI is allocated to another UE for use. When the C-RNTI is not allocated to another UE for use, the C-RNTI is allocated to the UE. Because the PCC allocates the C-RNTI to the UE in a random manner, a probability that a conflict occurs in the C-RNTI is effectively lowered.

Figure 6:
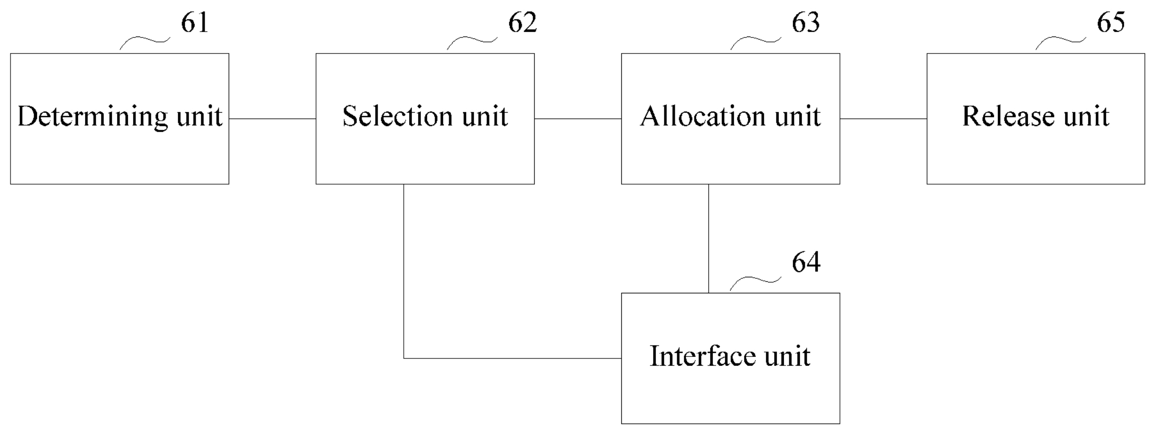
FIG. 6 is a schematic structural diagram of a C-RNTI allocation device according to the present application.

FIG. 6 is a schematic structural diagram of a C-RNTI allocation device according to the present application. The allocation device is configured to allocate a C-RNTI to user equipment (UE). The allocation device includes: a determining unit 61, a selection unit 62, and an allocation unit 63.

The determining unit 61 is configured to, when the UE accesses a serving cell, randomly determine, for the serving cell from a C-RNTI value range, a start position for selecting a C-RNTI.

The selection unit 62 is configured to select a C-RNTI for the UE from a C-RNTI interval range determined by the determining unit 61, where the interval range is smaller than the C-RNTI value range, and a start position of the interval range is the start position that is determined by the determining unit and that is used for selecting a C-RNTI.

The allocation unit 63 is configured to allocate, to the UE, the C-RNTI selected by the selection unit 62.

Specifically, the selection unit 62 is configured to randomly select a C-RNTI for the UE from the interval range.

Optionally, the C-RNTI value range includes a first range and a second range, where the first range is used for UE supporting carrier aggregation (CA), and the second range is used for UE not supporting CA.

In addition, when the UE supports CA, the start position that is determined by the determining unit 61 for the serving cell and that is used for selecting a C-RNTI and the interval range for selecting, by the selection unit 62, a C-RNTI are both located within the first range.

Alternatively, when the UE does not support CA, the start position that is determined by the determining unit 61 for the serving cell and that is used for selecting a C-RNTI and the interval range for selecting, by the selection unit 62, a C-RNTI are both located within the second range.

The manner of randomly determining, by the determining unit 61, the start position for selecting a C-RNTI, the manner of randomly selecting, by the selection unit 62, the interval range for selecting a C-RNTI, and the manner of randomly selecting a C-RNTI for the UE are the same as the random selection manners described in the foregoing method embodiments and are not described in detail herein again.

Optionally, the UE supports CA, the serving cell is a primary component carrier (PCC) of the UE, and the allocation device further includes: an interface unit 64.

The interface unit 64 is configured to send the selected C-RNTI to an entity at which a secondary component carrier (SCC) is located when the SCC of the UE is activated.

Specifically, the interface unit 64 is further configured to receive C-RNTI reallocation request information sent by the entity at which the SCC is located, where the C-RNTI reallocation request information is used to request an entity at which the PCC is located to reallocate a C-RNTI to the UE when the entity at which the SCC is located determines that the C-RNTI allocated by the entity at which the PCC is located to the UE is allocated to another UE for use.

The selection unit 62 is further configured to select at least two C-RNTIs for the UE according to the C-RNTI reallocation request information.

The interface unit 64 is further configured to send the selected at least two C-RNTIs to the entity at which the SCC is located.

Specifically, the selection unit 62 is specifically configured to randomly select the at least two C-RNTIs for the UE from the interval range.

Optionally, the allocation device further includes: a release unit 65.

The interface unit 64 is further configured to receive a C-RNTI selected by the entity at which the SCC is located from the at least two C-RNTIs.

The allocation unit 63 is further configured to send a reconfiguration message to the UE, where the reconfiguration message carries the C-RNTI selected by the entity at which the SCC is located.

The release unit 65 is configured to release a C-RNTI, selected for the UE, other than the C-RNTI selected by the entity at which the SCC is located.

Optionally, the interval range is preset or is determined by the entity at which the serving cell is located according to a quantity of UEs currently accessing the serving cell.

It should be noted that the allocation device provided in this embodiment of the present application may be implemented in a software manner or may be implemented in a hardware manner. This is not limited herein.

Figure 7:
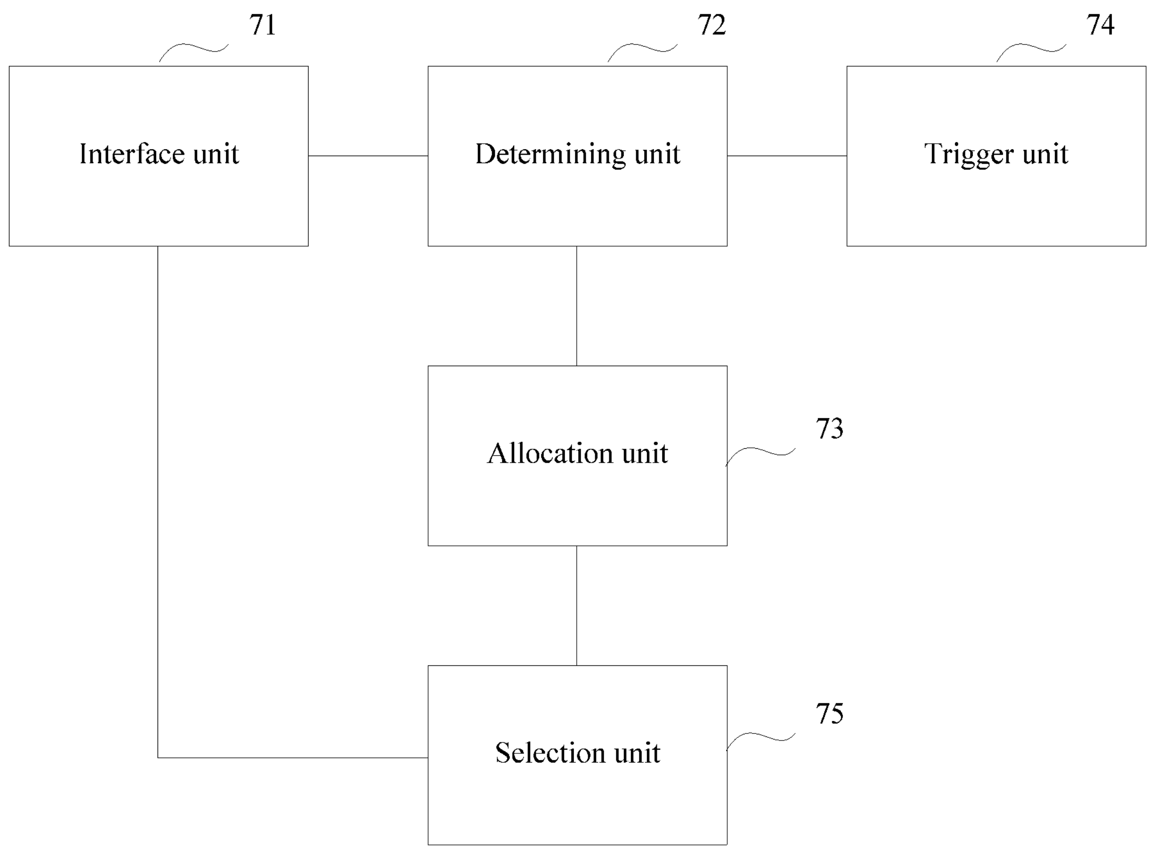
FIG. 7 is a schematic structural diagram of a C-RNTI allocation device according to the present application.

FIG. 7 is a schematic structural diagram of a C-RNTI allocation device according to the present application. The allocation device is configured to allocate a C-RNTI to user equipment (UE) supporting CA. Component carriers of the CA include a primary component carrier (PCC) and a secondary component carrier (SCC). The allocation device includes: an interface unit 71, a determining unit 72, and an allocation unit 73.

The interface unit 71 is configured to receive a C-RNTI sent by an entity at which the PCC is located, where the C-RNTI is selected by the entity at which the PCC is located for the UE from a C-RNTI interval range, a start position of the interval range is randomly determined, and the interval range is smaller than a C-RNTI value range.

The determining unit 72 is configured to determine whether the C-RNTI received by the interface unit 71 is allocated to another UE for use.

The allocation unit 73 is configured to allocate the C-RNTI to the UE when the determining unit 72 determines that the C-RNTI is not allocated to another UE for use.

Optionally, the C-RNTI is randomly selected by the entity at which the PCC is located for the UE from the interval range.

Optionally, the allocation device further includes: a trigger unit 74 and a selection unit 75.

The trigger unit 74 is configured to trigger requesting the entity at which the PCC is located to reallocate a C-RNTI to the UE when the determining unit 72 determines that the C-RNTI is allocated to another UE for use.

The interface unit 71 is further configured to receive at least two C-RNTIs reselected by the entity at which the PCC is located for the UE.

The selection unit 75 is configured to select, from the at least two C-RNTIs, a C-RNTI that is not allocated to another UE for use.

The interface unit 71 is further configured to send the selected C-RNTI to the entity at which the PCC is located and request the PCC to reallocate the selected C-RNTI to the UE.

Specifically, the interface unit 71 is configured to send C-RNTI reallocation request information to the entity at which the PCC is located, where the C-RNTI reallocation request information is used to request the entity at which the PCC is located to reallocate a C-RNTI to the UE.

Specifically, the interface unit 71 is configured to receive C-RNTI reallocation response information sent by the entity at which the PCC is located, where the C-RNTI reallocation response information includes the at least two C-RNTIs selected by the entity at which the PCC is located for the UE.

Optionally, the at least two C-RNTIs are randomly selected by the entity at which the PCC is located for the UE from the interval range.

It should be noted that the allocation device provided in this embodiment of the present application may be implemented in a software manner or may be implemented in a hardware manner. This is not limited herein.

Figure 8:
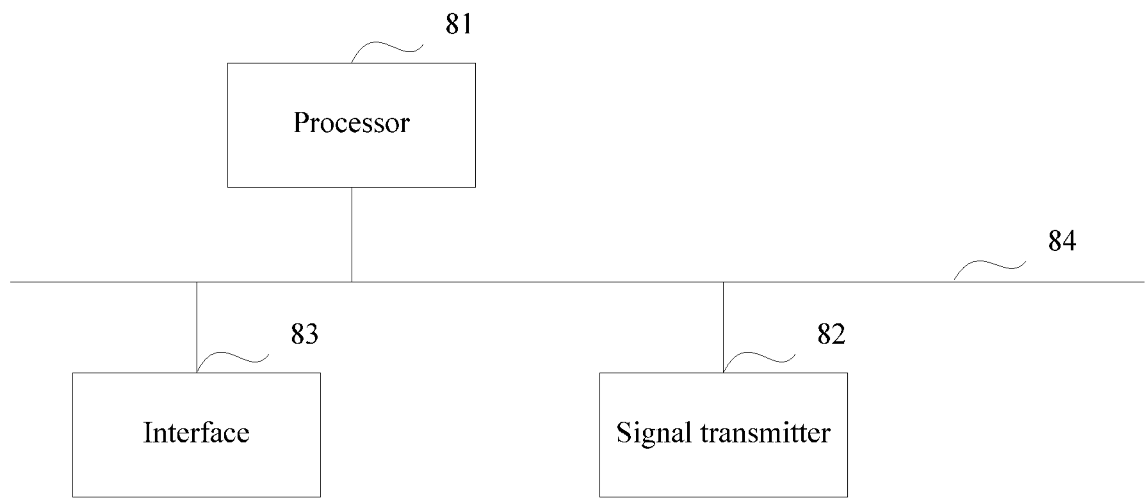
FIG. 8 is a schematic structural diagram of a C-RNTI allocation device according to the present application.

FIG. 8 is a schematic structural diagram of a C-RNTI allocation device according to the present application. The allocation device is configured to allocate a C-RNTI to user equipment (UE). The allocation device has functions recorded in the foregoing method embodiments and may use a general-purpose computer structure. Entities of the allocation device include: a processor 81 and a signal transmitter 82.

The processor 81 is configured to: randomly determine, when the UE accesses a serving cell, for the serving cell from a C-RNTI value range, a start position for selecting a C-RNTI; and select a C-RNTI for the UE from a C-RNTI interval range, where the interval range is smaller than the C-RNTI value range, and a start position of the interval range is the determined start position for selecting a C-RNTI.

The signal transmitter 82 is configured to allocate the selected C-RNTI to the UE.

Specifically, the processor 81 is configured to randomly select a C-RNTI for the UE from the interval range.

Optionally, the C-RNTI value range includes a first range and a second range, where the first range is used for UE supporting CA, and the second range is used for UE not supporting CA.

In addition, when the UE supports CA, the start position that is determined by the processor 81 for the serving cell and that is used for selecting a C-RNTI and the interval range are both located within the first range.

Alternatively, when the UE does not support CA, the start position that is determined by the processor 81 for the serving cell and that is used for selecting a C-RNTI and the interval range are both located within the second range.

Optionally, the UE supports CA, the serving cell is a primary component carrier (PCC) of the UE, and the processor 81 is further configured to send the selected C-RNTI to an entity at which an SCC is located when the SCC is activated.

Optionally, the allocation device further includes: an interface 83, configured to exchange information with the entity at which the SCC is located.

The interface 83 is configured to receive C-RNTI reallocation request information sent by the entity at which the SCC is located, where the C-RNTI reallocation request information is used to request an entity at which the PCC is located to reallocate a C-RNTI to the UE when the entity at which the SCC is located determines that the C-RNTI allocated by the entity at which the PCC is located to the UE is allocated to another UE for use.

The processor 82 is further configured to select at least two C-RNTIs for the UE according to the C-RNTI reallocation request information.

The interface 83 is further configured to send the selected at least two C-RNTIs to the entity at which the SCC is located.

Optionally, the interface 83 is further configured to receive a C-RNTI selected by the entity at which the SCC is located from the at least two C-RNTIs.

The signal transmitter 82 is further configured to send a reconfiguration message to the UE, where the reconfiguration message carries the C-RNTI selected by the entity at which the SCC is located.

The processor 81 is further configured to release a C-RNTI, selected for the UE, other than the C-RNTI selected by the entity at which the SCC is located.

Specifically, the processor 81 is configured to randomly select the at least two C-RNTIs for the UE from the interval range.

Optionally, the interval range is preset or is determined by the entity at which the serving cell is located according to a quantity of UEs currently accessing the serving cell.

The processor 81 may be one processor or may be a general term of multiple processing elements. For example, the processor may be a central processing unit (CPU), may be an application specific integrated circuit (ASIC), or may be one or more integrated circuits configured to implement this embodiment of the present application, such as one or more microprocessors (DSP) or one or more field programmable gate arrays (FPGA).

The interface 83 may be an interface circuit between base stations, such as an X2 interface circuit or an S1 interface circuit, or even an air interface. When the PCC and the SCC are located in a same base station, the interface 83 may be a connection interface of cabling.

In addition, the processor 81, the interface 83, and the signal transmitter 82 are connected and complete mutual communication by using a bus 84. The bus 84 may be an industry standard architecture (ISA) bus, a peripheral component interconnect (PCI) bus, an extended industry standard architecture (EISA) bus, or the like. The bus 84 may be classified into an address bus, a data bus, a control bus, and the like. To facilitate representation, the bus 84 is represented by using only one line in FIG. 8, but it does not indicate that there is only one bus or one type of buses.

Figure 9:
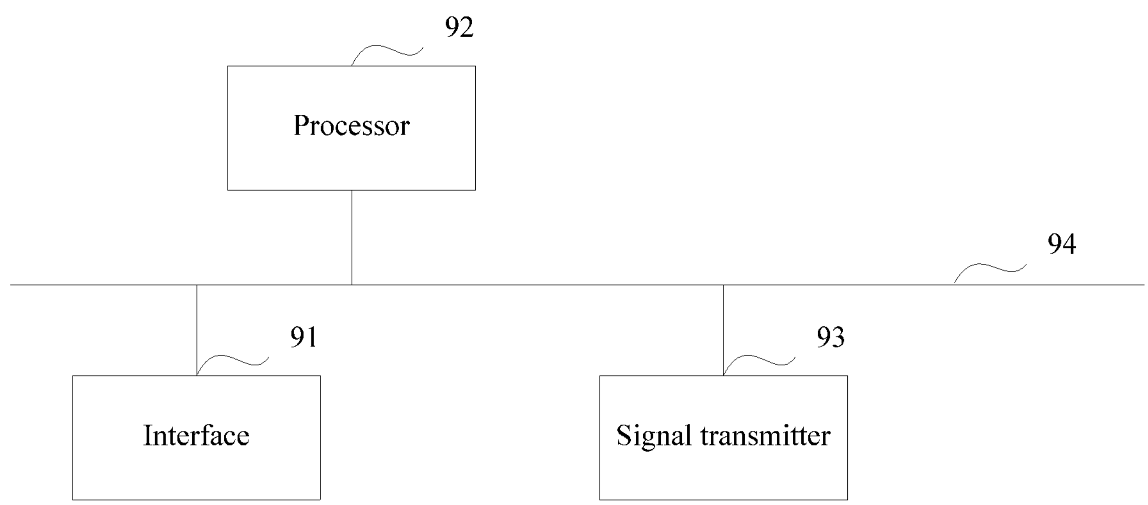
FIG. 9 is a schematic structural diagram of a C-RNTI allocation device according to the present application.

FIG. 9 is a schematic structural diagram of a C-RNTI allocation device according to the present application. The allocation device is configured to allocate a C-RNTI to user equipment (UE) supporting CA. Component carriers of the CA include a primary component carrier (PCC) and a secondary component carrier (SCC). The allocation device has functions recorded in the foregoing method embodiments and may use a general-purpose computer structure. An entity of the allocation device include: an interface 91, a processor 92, and a signal transmitter 93.

The interface 91 is configured to exchange information with an entity at which the PCC is located, and specifically configured to receive a C-RNTI sent by the entity at which the PCC is located, where the C-RNTI is selected by the entity at which the PCC is located for the UE from a C-RNTI interval range, a start position of the interval range is randomly determined, and the interval range is smaller than a C-RNTI value range.

The processor 92 is configured to determine whether the C-RNTI is allocated to another UE for use.

The signal transmitter 93 is configured to allocate the C-RNTI to the UE when the C-RNTI is not allocated to another UE for use.

Optionally, the C-RNTI is randomly selected by the entity at which the PCC is located for the UE from the interval range.

Specifically, the processor 92 is further configured to trigger requesting the entity at which the PCC is located to reallocate a C-RNTI to the UE when it is determined that the C-RNTI is allocated to another UE for use.

The interface 91 is further configured to: receive at least two C-RNTIs reselected by the entity at which the PCC is located for the UE, and select, from the at least two C-RNTIs, a C-RNTI that is not allocated to another UE for use; and send the selected C-RNTI to the entity at which the PCC is located and request the PCC to reallocate the selected C-RNTI to the UE.

Specifically, the interface 91 is configured to send C-RNTI reallocation request information to the entity at which the PCC is located, where the C-RNTI reallocation request information is used to request the entity at which the PCC is located to reallocate a C-RNTI to the UE.

Specifically, the interface 91 is configured to receive C-RNTI reallocation response information sent by the entity at which the PCC is located, where the C-RNTI reallocation response information includes the at least two C-RNTIs allocated by the entity at which the PCC is located for the UE.

Optionally, the at least two C-RNTIs are randomly selected by the entity at which the PCC is located for the UE from the interval range.

The processor 92 may be one processor or may be a general term of multiple processing elements. For example, the processor may be a central processing unit (CPU), may be an application specific integrated circuit (ASIC), or may be one or more integrated circuits configured to implement this embodiment of the present application, such as one or more microprocessors (DSP) or one or more field programmable gate arrays (FPGA).

The interface 91 may be an interface circuit between base stations, such as an X2 interface circuit or an S1 interface circuit, or even an air interface. When the PCC and the SCC are located in a same base station, the interface 91 may be a connection interface of cabling.

In addition, the processor 92, the interface 91, and the signal transmitter 93 are connected and complete mutual communication by using a bus 94. The bus 94 may be an industry standard architecture (ISA) bus, a peripheral component interconnect (PCI) bus, an extended industry standard architecture (EISA) bus, or the like. The bus 94 may be classified into an address bus, a data bus, a control bus, and the like. To facilitate representation, the bus 94 is represented by using only one line in FIG. 9, but it does not indicate that there is only one bus or one type of buses.

In this embodiment, when an application is executed by a processor, refer to the foregoing method embodiments for processing of a deployment device and a method of interaction with another network element. Details are not described herein.

The device provided in this embodiment may resolve a problem, existing in the prior art, of low estimation accuracy when an image feature is estimated.

A person skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A method, comprising:

randomly determining, by an entity at which a serving cell is located, a start position of a cell radio network temporary identifier (C-RNTI) interval range for selecting a C-RNTI when a user equipment (UE) accesses the serving cell, wherein the C-RNTI interval range is smaller than a C-RNTI value range;

randomly selecting, by the entity at which the serving cell is located, a C-RNTI for the UE from the C-RNTI interval range; and allocating, by the entity at which the serving cell is located, the selected C-RNTI to the UE.

2. The method according to claim 1, wherein the C-RNTI value range comprises a first range and a second range, wherein the first range is used for UE supporting carrier aggregation (CA), and the second range is used for UE not supporting CA; and wherein when the UE supports CA, the start position and the interval are both located within the first range; or when the UE does not support CA, the start position and the interval are both located within the second range.

3. The method according to claim 1, wherein the UE supports CA, the serving cell is a primary component carrier (PCC) of the UE, and the method further comprises:

when a secondary component carrier (SCC) of the UE is activated, sending, by the entity at which the PCC is located, the selected C-RNTI to an entity at which the SCC is located.

4. The method according to claim 3, further comprising:

receiving, by the entity at which the PCC is located, C-RNTI reallocation request information sent by the entity at which the SCC is located, wherein the C-RNTI reallocation request information requests the entity at which the PCC is located to reallocate a C-RNTI to the UE when the entity at which the SCC is located determines that the C-RNTI allocated by the entity at which the PCC is located to the UE is allocated to another UE for use; and selecting, by the entity at which the PCC is located, a plurality of C-RNTIs for the UE according to the C-RNTI reallocation request information and sending the selected plurality of C-RNTIs to the entity at which the SCC is located.

5. The method according to claim 3, further comprising:

receiving, by an entity at which the SCC is located, the C-RNTI selected by the entity at which the PCC is located;

determining, by the entity at which the SCC is located, whether the C-RNTI is allocated to another UE for use; and allocating, by the entity at which the SCC is located, the C-RNTI to the UE when it is determined that the C-RNTI is not allocated to another UE for use.

6. The method according to claim 4, wherein selecting, by the entity at which the PCC is located, the plurality of C-RNTIs for the UE comprises:

randomly selecting, by the entity at which the PCC is located, the plurality of C-RNTIs for the UE from the interval range.

7. The method according to claim 4, further comprising:

receiving, by the entity at which the PCC is located, a C-RNTI selected by the entity at which the SCC is located from the plurality of C-RNTIs;

sending, by the entity at which the PCC is located, a reconfiguration message to the UE, wherein the reconfiguration message carries the C-RNTI selected by the entity at which the SCC is located; and releasing, by the entity at which the PCC is located, a C-RNTI, selected for the UE, other than the C-RNTI selected by the entity at which the SCC is located.

8. The method according to claim 4, further comprising:

receiving, by the entity at which the SCC is located, the plurality of C-RNTIs selected by the entity at which the PCC is located for the UE;

selecting, by the entity at which the SCC is located, from the plurality of C-RNTIs, another C-RNTI that is not allocated to another UE for use; and sending, by the entity at which the SCC is located, the selected another C-RNTI to the entity at which the PCC is located.

9. The method according to claim 1, wherein the interval range is preset or is determined by the entity at which the serving cell is located according to a quantity of UEs currently accessing the serving cell.

10. A device, comprising:

a processor; and a non-transitory computer readable storage medium, wherein the non-transitory computer readable storage medium stores a program, and the processor executes the program to:

randomly determine a start position of a cell radio network temporary identifier (C-RNTI) interval range for selecting a C-RNTI when a user equipment (UE) accesses a serving cell, wherein the C-RNTI interval range is smaller than a C-RNTI value range;

randomly select a C-RNTI for the UE from the C-RNTI interval range; and allocate the selected C-RNTI to the UE.

11. The device according to claim 10, wherein the C-RNTI value range comprises a first range and a second range, wherein the first range is used for UE supporting carrier aggregation (CA), and the second range is used for UE not supporting CA; and when the UE supports CA, the start position and the interval range are both located within the first range; or when the UE does not support CA, the start position and the interval range are both located within the second range.

12. The device according to claim 10, wherein the UE supports CA, the serving cell is a primary component carrier (PCC) of the UE, and the processor further executes the program to:

send the selected C-RNTI to an entity at which a secondary component carrier (SCC) is located when the SCC of the UE is activated.

13. The device according to claim 10, wherein the interval range is preset or is determined according to a quantity of UEs currently accessing the serving cell.

14. The device according to claim 12, wherein the processor further executes the program to:

receive C-RNTI reallocation request information sent by the entity at which the SCC is located, wherein the C-RNTI reallocation request information requests the entity at which the PCC is located to reallocate a C-RNTI to the UE when the entity at which the SCC is located determines that the C-RNTI allocated by the entity at which the PCC is located to the UE is allocated to another UE for use;

select a plurality of C-RNTIs for the UE according to the C-RNTI reallocation request information; and send the selected plurality of C-RNTIs to the entity at which the SCC is located.

15. The device according to claim 14, wherein the plurality of C-RNTIs are randomly selected for the UE from the interval range.

16. The device according to claim 14, wherein the processor further executes the program to:

receive a C-RNTI selected by the entity at which the SCC is located from the plurality of C-RNTIs;

send a reconfiguration message to the UE, wherein the reconfiguration message carries the C-RNTI selected by the entity at which the SCC is located; and release a C-RNTI, selected for the UE, other than the C-RNTI selected by the entity at which the SCC is located.

17. A system, comprising:

a first entity at which a primary component carrier (PCC) of a user equipment (UE) is located; and a second entity at which a secondary component carrier (SCC) of the UE is located;

wherein the first entity is configured to:

select a cell radio network temporary identifier (C-RNTI) for the UE, wherein selecting the C-RNTI for the UE comprises:

randomly determine a start position of a cell radio network temporary identifier (C-RNTI) interval range for selecting the C-RNTI when the UE accesses the PCC, wherein the C-RNTI interval range is smaller than a C-RNTI value range; and randomly select a C-RNTI for the UE from the C-RNTI interval range;

allocate the C-RNTI to the UE; and send the selected C-RNTI to the entity at which the SCC is located;

wherein the second entity is configured to:

receive the C-RNTI selected by the first entity;

determine whether the C-RNTI is allocated to another UE for use; and allocate the C-RNTI to the UE when it is determined that the C-RNTI is not allocated to another UE for use.

18. The system according to claim 17, wherein the first entity is configured to randomly select the C-RNTI for the UE from the interval range.

19. The system according to claim 17, wherein the C-RNTI value range comprises a first range and a second range, wherein the first range is used for UE supporting carrier aggregation (CA), and the second range is used for UE not supporting CA; and wherein when the UE supports CA, the start position and the interval are both located within the first range, or when the UE does not support CA, the start position and the interval are both located within the second range.

20. The system according to claim 17, wherein:

the second entity is further configured to send C-RNTI reallocation request information to the first entity when it is determined that the C-RNTI selected by the first entity is allocated to another UE for use, wherein the C-RNTI reallocation request information requests the first entity at which the PCC is located to reallocate a C-RNTI to the UE; and the first entity is further configured to receive the C-RNTI reallocation request information, select a plurality of C-RNTIs for the UE according to the C-RNTI reallocation request information, and send the selected plurality of C-RNTIs to the second entity; and the second entity is further configured to receive the plurality of C-RNTIs, select another C-RNTI that is not allocated to another UE for use from the plurality of C-RNTIs, and send the selected another C-RNTI to the first entity.

21. The system according to claim 20, wherein the first entity is further configured to:

receive the another C-RNTI selected by the second entity from the plurality of C-RNTIs;

send a reconfiguration message to the UE, wherein the reconfiguration message carries the another C-RNTI selected by the second entity; and release a C-RNTI comprised in the plurality of C-RNTIs, selected for the UE, other than the another C-RNTI selected by the second entity.

22. The system according to claim 20, wherein the plurality of C-RNTIs are randomly selected by the first entity for the UE from the interval range.

* * * * *